Patented Aug. 23, 1938

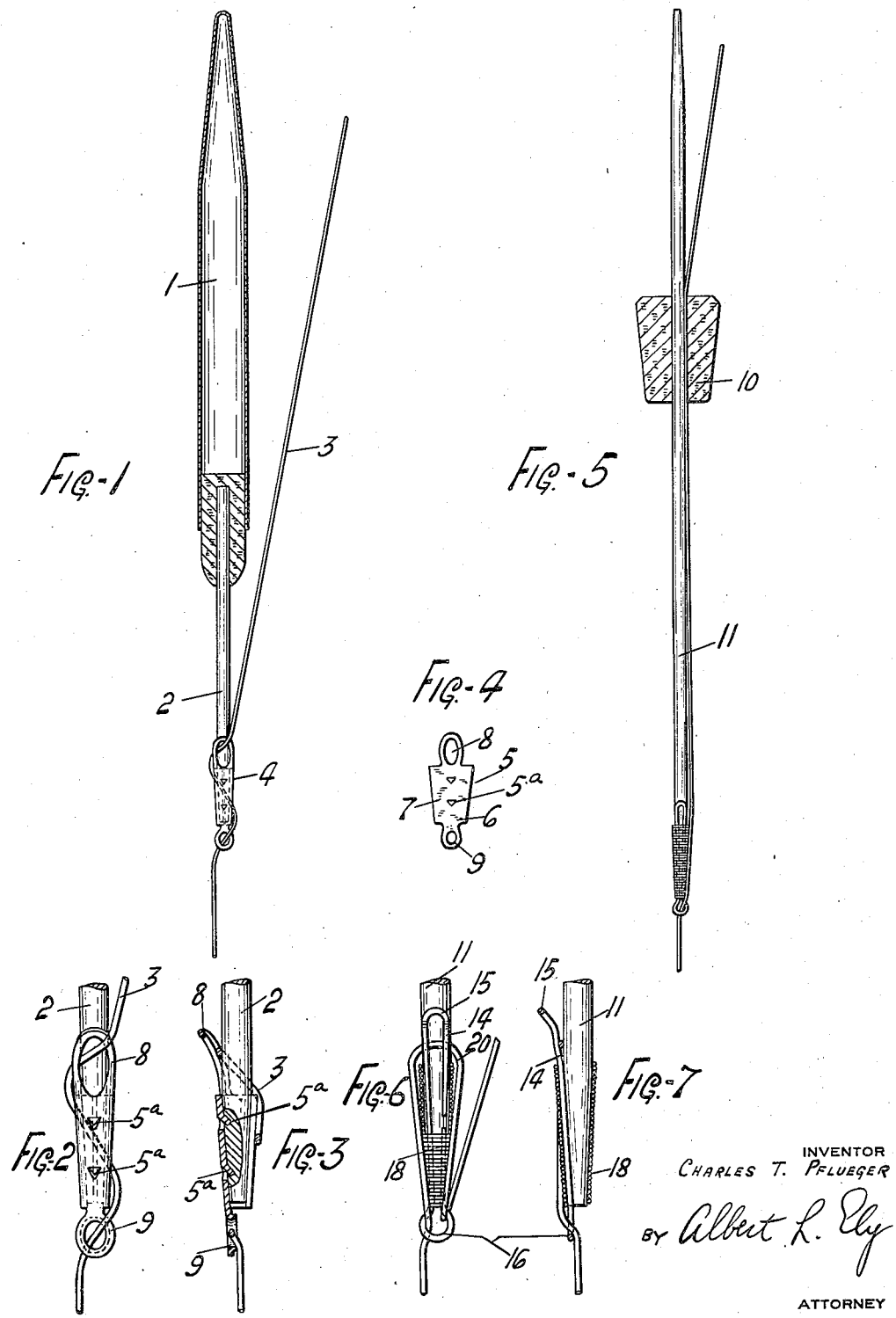

2,127,667

UNITED STATES PATENT OFFICE 2,127,667

FLOAT CONSTRUCTION

Charles T. Pflueger, Akron, Ohio, assignor to The Enterprise Manufacturing Company, Akron, Ohio, a corporation of Ohio Application March 20, 1937, Serial No. 132,112

3 Claims. (Cl. 43—49)

The present invention relates to the art of fishing and has as its object the improvement of floats or bobbers used in still fishing.

One of the objects of the invention is to improve upon the means for attaching the line to the float and particularly to devise an attachment for the float by which the fisherman can attach the line in alternative fashions so that the float can be either fixed in position on the line or easily adjusted thereon. It is a further advantage or object of the invention to provide an attachment for the float by which the line can be secured without disconnecting the hook or sinkers, if desired.

Another object of the invention is to provide a novel and useful line attaching means for a float which will be inexpensive to manufacture and, in the preferred form, to make such an attachment from a metal stamping which can be crimped around the end of the float stick and thus avoid wrappings which are commonly used and which are expensive and not permanent.

In the drawing in which the invention is shown in alternate forms:

Fig. 1 is a view of a light celluloid float body, to the stick of which is attached the preferred form of the metal clip made from a stamping and showing one manner of attaching the line;

Fig. 2 is an enlarged view of the clip;

Fig. 3 is a view at right angles to Fig. 2, showing the clip in section;

Fig. 4 is a view of the stamping laid out preliminary to the forming operation;

Fig. 5 is a different form of float showing a modified clip or attachment and an alternative method of securing the line to the float;

Fig. 6 is an enlarged view of the construction shown in Fig. 5 with a part of the wrapping removed and another method of line attachment; and Fig. 7 is a view at right angles to Fig. 6.

Referring particularly to Fig. 1, there is shown a new form of float, the body 1 of which is made from celluloid and to which is fastened the stick 2. The line is indicated at 3. This form of float is the subject matter of a copending application of the inventor, Serial No. 132,111, filed March 20, 1937. The clip or attachment by which the line is secured to the float is indicated by the numeral 4 and is composed of a single metal stamping crimped upon the end of the stick and secured in place without any other attaching means.

This stamping consists of a single plate 5 with oppositely extending wings 6 and 7 which are bent about the end of the stick and crimped or squeezed in place thereon. Small barbs 5a may be stuck outwardly from the plate to embed in the stick and secure the plate more firmly. From one side of the stamping extends the eye or loop 8 which, when the clip is secured in position, is bent outwardly slightly so as to permit the passage of the line 3 either through or under the loop as the case may be. From the other side of the stamping projects another eye 9 which extends outwardly from the stick. The edge of the metal about this eye may be rounded as shown in Fig. 3 to prevent cutting of the line.

If the fisherman wishes to fasten the float to the line in such a way that it may readily be shifted upon the line to carry the hook at a different depth, he passes the line through the eye 8, wraps it once or twice about the clip and then passes it through the eye 9. The eye 8 will yield slightly so that the line can be forced between the eye and the stick and be firmly held at this point. This makes a sufficiently tight pinch so that the float will normally stay in the position in which it is placed, but in which the float may readily be shifted. In this form of attachment the hook and sinkers cannot be on the line at the time the float is attached.

In the form shown in Figs. 5, 6 and 7, an ordinary cork float or bobber 10 is slidably mounted upon the quill or stick 11 and another form of attachment to the line is shown. In this form the clip is made of a double wire loop 14 having the one eye 15 lying alongside of but bent slightly away from the stick and another eye 16 depending from the stick. A wrapping of thread 18 holds the loop in position.

In Fig. 5 the line is attached by merely passing it through one of the eyes and under the float which holds it in position by friction.

In Figs. 5 and 6 is shown a third method of attaching the line, although, as will be understood, any of the forms of line attachment may be employed with either clip. In fastening the float upon the line as shown, a loop 20 is made in the line, which is then passed through the eye 16 and over the eye 15, and then drawn slightly down, the eye 15 yielding slightly so as to pinch the line at this point. This method of attaching the float may be employed when the hook and sinkers are already attached to the line and makes it possible to attach or change floats without disconnecting those elements.

Either form of clip or attachment may be used on any float stick or quill, one aspect of the invention being that by the formation of the two eyes either method of attaching the line may be employed. The stamped metal clip has advantages over the wrapped form as it is cheaper to make and is more permanently secured upon the quill or stick.

Having explained the invention, it will be understood that modifications or variations thereof may be adopted without departing from the essential features of the invention as set forth in the claims.

What is claimed is:

1. In a float construction for fishing, a stick and a clip for attachment of the line secured to the end of the stick, said clip having an eye extending beyond the end of the stick and a second eye spaced therefrom and disposed laterally of the stick, the second eye being bent outwardly from the stick so that the line may pass through the eye or be looped under the eye, the second eye being sufficiently yielding to pinch the line between it and the stick.

2. In a float construction for fishing, a stick and a sheet metal clip wrapped about the end of the stick, said clip having an eye on one side thereof extending beyond the end of the stick and a second eye on the opposite side of the clip lying alongside the clip.

3. In a float construction for fishing, a stick and a sheet metal clip wrapped about the end of the stick, said clip having an eye on one side thereof extending beyond the end of the stick and a second eye on the opposite side of the clip lying alongside the clip and bent outwardly so that the line may be passed through the eye or looped under the eye, the second eye being sufficiently yielding to pinch the line between it and the stick.

CHARLES T. PFLUEGER.